United States Patent [19]
Dym et al.

[11] 3,992,579
[45] Nov. 16, 1976

[54] TABLET SYSTEM WITH DIGITAL ACTIVATION

[75] Inventors: Herbert Dym, Poughkeepsie; Stanley F. Kambic, Yorktown Heights, both of N.Y.

[73] Assignee: IBM Corporation, Armonk, N.Y.

[22] Filed: June 2, 1975

[21] Appl. No.: 583,350

[52] U.S. Cl. .............................................. 178/18
[51] Int. Cl.² ..................................... G08C 21/00
[58] Field of Search............ 178/18, 19, 20; 33/1 M, 33/23 J; 340/347 AD, 146.3 SY

[56] References Cited
UNITED STATES PATENTS

| 3,342,935 | 9/1967 | Leifer et al. ........................ | 178/19 |
| 3,828,128 | 8/1974 | Dethloff et al........................ | 178/18 |

OTHER PUBLICATIONS

Ivashchenko, et al., "Inductive Transducers....," Soviet Journal of Instrumentation and Control, No. 8, Aug. 1969, pp. 22–25.

*Primary Examiner*—Thomas A. Robinson
*Attorney, Agent, or Firm*—William S. Robertson

[57] ABSTRACT

An improved tablet system is disclosed of the type having an array of X and Y dimension wires that are capacitively coupled to a pen that a user holds to the tablet to produce a position signal. Drivers are provided for individual wires to produce a selected activation pattern for the wires. The drivers are operated from a shift register and associated components that are mounted on the tablet and are connected to an associated processor through only a small number of conductors.

7 Claims, 3 Drawing Figures

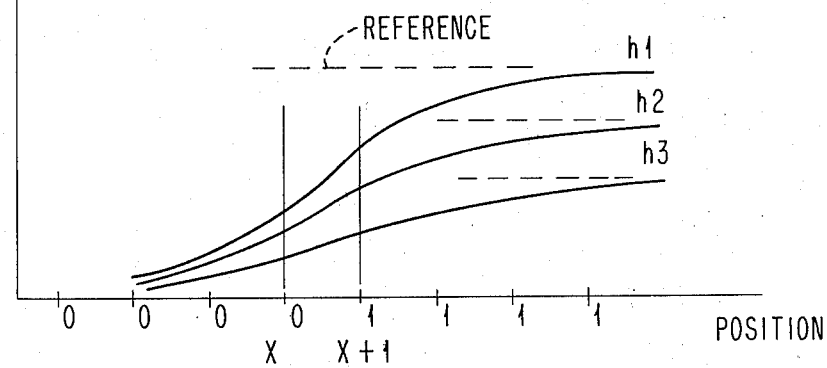
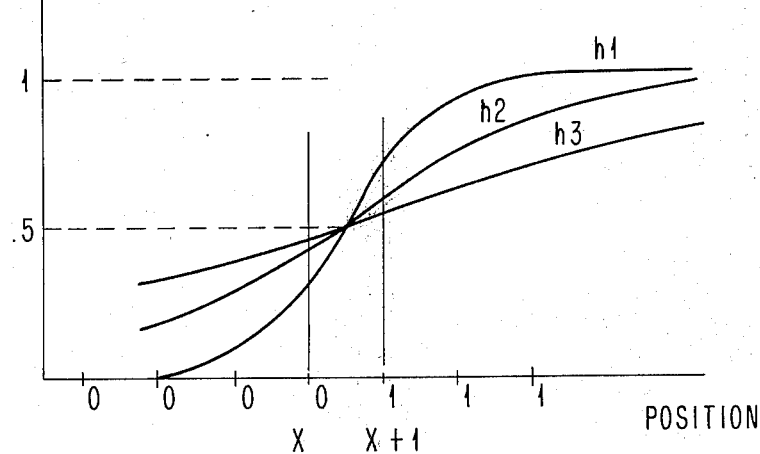

TABLET SYSTEM WITH DIGITAL ACTIVATION

RELATED CASES

U.S. Pat. No. 3,582,962 to Robert V. Mazza and Application Ser. No. 343,577, filed Mar. 21, 1973 by Herbert Dym now U.S. Pat. 3,921,165, issued Nov. 18, 1975 each provide background information that will be helpful in understanding objects and features of this invention and the conventional components that are used in the preferred embodiment of the invention.

INTRODUCTION

A summary description of a conventional capacitive tablet will be a helpful introduction to the objects and features of this invention. Conventionally, a capacitive tablet has a set of closely spaced wires that establish an alternating voltage across the X dimension of the tablet and a similar set of wires that establish a voltage across the Y dimension of the tablet. The amplitude of this alternating voltage increases linearly in either dimension from ground potential at one edge of the tablet to a predetermined voltage at the opposite edge. (The position detecting operation takes place on each dimension separately.) In the operation of a tablet of this type, a voltage sensing pen is positioned at a selected point between the minimum and maximum voltage positions and it receives a voltage by capacitive coupling to the X or Y wires. The ratio of the voltage that the pen receives at its actual location to a reference voltage that it would receive at the maximum voltage position is the ratio of the pen position to the position of maximum voltage. In a separate operation the tablet wires are energized uniformly at the maximum voltage to produce the reference signal without actually moving the pen to the reference position, and the pen position is calculated from the two pen signals.

The tablet is used with an associated processor. The processor may perform the arithmetic operations for detecting the pen position from the pen signals and it may provide control signals for operating the tablet. In addition, the processor runs the programs that use the pen position signals in the graphic operations that are selected by the tablet user.

SUMMARY OF THE INVENTION

In the tablet of this invention, the X and Y dimension wires each have individual drivers that apply an alternating voltage to an associated wire. A driver has two states; the state in which the wire receives the alternating voltage will be called "activated" and the state in which the wire does not receive an alternating voltage will be called "not activated". The drivers are activated in a pattern to produce a voltage change along the selected dimension of the tablet only in the neighborhood of the pair of wires on either side of the pen position. A more detailed description will be given later to show that the pen signal that is produced by an activation pattern gives sufficient information for detecting the pen position.

The activation pattern for a set of drivers is controlled by a bit pattern that is set into a register. In the preferred tablet the register is a shift register. For each driver there is a corresponding bit position in the shift register. The register holds a 1 bit for activating the associated driver and it holds a 0 bit for the not activated condition of the associated driver. The register is shifted to the right or to the left to shift the activation pattern correspondingly. These components readily provide a succession of wires to the left (arbitrarily) of the pen position that are not activated and a succession of wires to the right of the pen position that are activated.

The register has an input to set it to all 1 bits (or to reset to all 0 bits) and it is shifted to enter 0 bits (or 1 bits, if the register resets to 0) at the left end to produce a selected pattern. In addition, a logic circuit is provided for activating each of the drivers without changing the register contents for the operation of sensing the reference voltage.

These drivers and controls can be constructed in integrated circuit form and can be mounted on the tablet structure. Only a small number of conductors are required for connection to the associated processor.

Other objects and features of the invention will be apparent from the detailed description of a preferred embodiment of the invention.

THE DRAWING

FIG. 2 shows a family of pen characteristic curves for differing pen heights.

FIG. 3 shows a family of curves of the ratio of the pen signal to the reference value for differing pen heights.

THE TABLET SYSTEM OF THE DRAWING

I. Introduction

Figure 1:
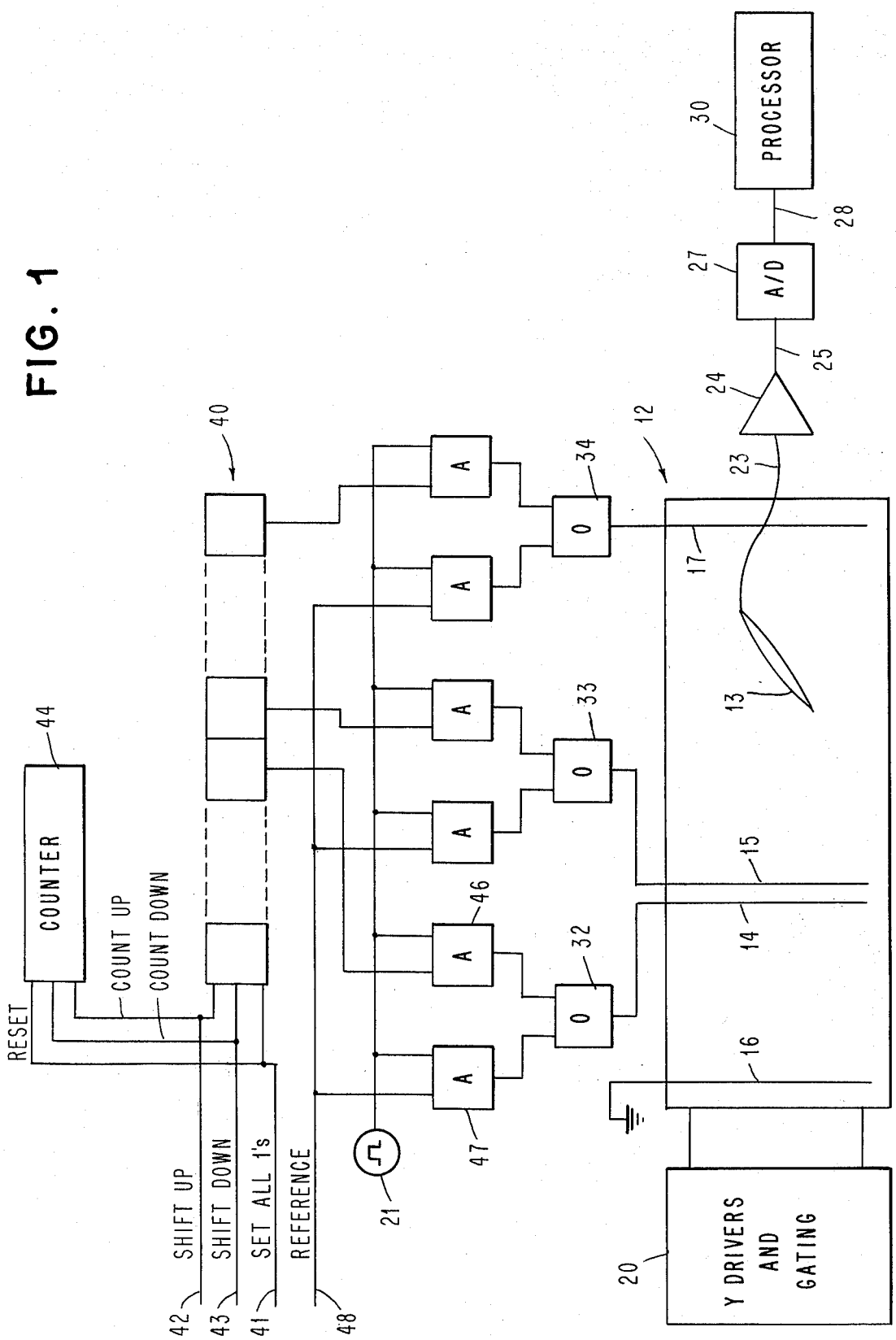
FIG. 1 is a schematic showing of the tablet system of this invention.

The tablet 12 of FIG. 1 has two layers of a dielectric material that each carry a set of wires for one dimension of the tablet. The drawing shows representative X dimension wires 14, 15, 16, 17. Wires 14 and 15 are adjacent and illustrate the construction and operation of two adjacent wires of the tablet. Wire 16 at the left hand edge of the tablet is grounded to establish a not activated condition at this edge of the tablet. Preferably the wires are about one eigth of an inch apart. The two layers of wires and their dielectric support are preferably covered with a material such as glass that forms the surface of the tablet, and the tablet user may put one or several layers of paper over the tablet surface.

A pen 13 is positionable on the tablet surface or on the paper and it receives a signal from the wires that is converted to a digital position signal. This digital position signal can be thought of as an X address or a Y address that each have two parts. The first or high order part of the address identifies the pen position in terms of the adjacent X or Y wires. The second or low order part of the address further identifies the location of the pen in the space between the neighboring wires.

The preferred pen is described in the *IBM Technical Disclosure Bulletin*, November, 1974, page 1690. Pen 13 is capacitively coupled to the wires and it receives an alternating voltage signal from these wires and produces a corresponding pen output signal on a line 23. A detector circuit 24 receives the alternating voltage signal on line 23 and produces a direct voltage output on a line 25 that is an analog representation of the pen signal on line 23. (Detector circuits are well known.) The amplitude of the signal on lines 23 and 25 depends on the activation pattern and on the pen position in the activation pattern as will be explained later. An analog to digital converter 27 receives the signal on line 25 and produces a corresponding digital value on a line 28. Apparatus and methods for converting the analog signal on line 25 to a digital signal are well known. A processor 30 operates on the digital pen signal on line 28 to produce the pen position address and it supplies controlling signals to the tablet, as will be explained later. The pen address that is formed by processor 30 is normally in the form of an input to an application program that operates on the position signals; it may also be used as an input to a display.

II. The Driver System

FIG. 1 shows representative drivers 32, 33, 34 for the X dimension wires; the drawing also shows connections from the Y dimension wires that lead to a similar set of drivers and their gating circuits that are shown as a block 20. Each driver is an OR logic gate and responds to the OR logic function of two inputs. Representative driver 32 receives inputs from AND gates 46 and 47. Each AND gate receives the output of an oscillator 21 at one of its inputs. Oscillator 21 produces pulses of appropriate wave shape to form a sequence of 1 and 0 bits. AND gate 46 and the corresponding AND gate of each other driver receives a controlling input from a stage of a shift register 40. AND gate 47 and the corresponding gate of each other driver receives a controlling input from a line 48 that provides a signal called Reference. When the signal Reference has a 1 logic level, gate 47 and driver 32 for wire 14 and the corresponding gates and drivers for the other X dimension wires apply the output of oscillator 21 to each of the X dimension wires. When the signal Reference has a logical 0 level, gate 46 and driver 32 (and the corresponding gates and drivers for the other wires) apply the output of oscillator 21 to the associated X dimension wire only if the associated stage of register 40 holds a logical 1. These operations activate tablet wires. In the complement states a driver maintains a fixed potential (such as ground) at its output and the associated wire is not activated.

Shift registers are well known. A shift register is an interconnection of binary latches that respond to timing and control signals to shift the contents of each latch to the latch on the right ("shift up") or to the left ("shift down"). In register 40 the bit in the right most stage is lost on a shift up operation and the left most stage receives a 0 bit. On a shift down operation, the left most bit is lost and the right most stage receives a 1 bit. Register 40 preferably has one bit position for each X dimension driver. An activation pattern is set into register 40 by signals on three input lines, 41, 42, 43. In response to a signal called Set All 1's on line 41, each stage is set to a 1, and in response to a signal on line 42 or 43 register 40 shifts up (to the right) or down (to the left). In the tablet operations that will be described later, register 40 is first set to all 1's and is then shifted up until the signal from pen 13 indicates that the wires to the right of the pen position are activated and the wires to the left of the pen are not activated. This operation identifies the pen position with respect to two adjacent wires such as 14, 15 and it provides a pen amplitude signal. The signal Reference on line 48 then causes all of the wires to be activated and a pen reference signal is produced on lines 23, 25 and 28. These operations will be described in more detail in section IV of this specification.

A counter 44 counts the operations on shift register 40 to identify the address of the adjacent wires where a 0 to 1 transition takes place. Line 41 provides a signal Reset to reset the counter to all 0's when register 40 is reset to reset the counter to all 0's when register 40 is reset to all 1's. Line 42 provides a signal Count Up to advance the counter when register 40 is shifted to the right, and line 43 provides a signal Count Down to subtract 1 from the counter when register 40 is shifted to the left. Thus, for an address system in which the wires are numbered from left to right starting with wire 16 as number zero, the count in counter 44 identifies the left wire of a pair of wires when a 0 to 1 transition takes place. Counter 44 is preferably located off the tablet structure to avoid the electrical connections that would otherwise be required for reading the contents of the counter. The counter function may be provided by general purpose components of processor 30.

III. The Pen Signal Characteristic — FIGS. 2 and 3

FIG. 2 shows the amplitude of the pen signal on lines 23, 25, 28 as a function of position along the X axis. Increments that are marked on the X axis represent the position of wires along the X axis of the tablet. A wire that is designated by an address X and wires to the left of this position are unactivated, as a 0 at these positions indicates. (The actual value of address X is held in counter 44.) Wires to the right are activated, as is represented by a 1. The pen signal at any position along the X axis is a function of the pen height, and a family of curves is shown. The highest amplitude curve, $h1$, is related to the high capacitive coupling between the pen and wires when the pen height is low. Conversely, the low amplitude curve, $h3$, shows the characteristic at a greater pen height. In each of these curves, a pen in the region of the unactivated wires receives a relatively low potential, and as the pen is moved to the right the signal amplitude increases. In the region between the adjacent 0 and 1 wires and for a significant distance on either side of these wires, the characteristic curve has a positive slope that is usefully linear. As the pen is moved further towards the right, the amplitude approaches a limiting value that will be called a "reference" value. The reference values are shown by dashed lines for the three curves of FIG. 2. The characteristic curves of FIG. 2 have the property that the amplitude of this reference value is twice the amplitude of the pen signal at the mid-point of the space between the 0 wire and the 1 wire.

The curves of FIG. 2 can be developed analytically by considering that a signal activated wire would produce an electric field that decreases with pen height and decreases with distance along the X dimension on either side of the activated wire. The sum of these fields for the activated wires gives the curves of FIG. 2.

FIG. 3 shows curves for the ratio of the pen height to the reference value for differing pen heights $h1$, $h2$, $h3$. These curves represent the operation that has already been introduced in which the pen position signal and the pen reference signals of FIG. 2 are sampled and their ratio is formed. It can be seen that these curves are closely linear in the region between wires X and Z + 1 and for a substantial distance beyond these wires. Because the pen amplitude at the mid-point is one half the reference amplitude, the curves intersect at one point.

The pen is operated on the tablet surface or at a substantially fixed height above the tablet surface. In this condition the operation takes place along a single curve of FIG. 2 and the corresponding curve of FIG. 3. The minimum pen signal at address X and the maximum pen signal at address X+1 are easily sampled for a particular tablet arrangement and these values are used in operations that will be described later. It is a feature of our tablet that the range of these values corresponds to only the small distance between adjacent wires whereas conventionally this range is distributed across a number of wires.

IV. Operation

Suppose that the tablet user has positioned the pen at a location having an address $XxYy$, where X and Y are the numbers that identify the wires to the left of the pen position and $x$ and $y$ are distances from these wires to the actual pen position. The accuracy of the analog circuits limits the values of $x$ and $y$ to fixed increments, but with the improved range of pen signals of this invention, the space between adjacent wires can be resolved into about 200 parts.

When the pen is first positioned on the tablet surface, a pen signal appears at input 28 to start a position sensing operation. This signal may be provided by activating each of the X wires in response to the signal Reference of line 48.

In response to the signal that a pen position operation is to start, processor 30 or other suitable signal source provides the signal Set All 1's on line 41, an operation that activates each X dimension wire except left most wire 16. Processor 30 then receives the digital signal on line 28 and compares this value with the digital values for the minimum and maximum values that occur when the pen is in the region of a O to 1 transition.

If the pen is not in the first space to the right of wire 16 (ie., the pen is not at address X=0) this value on line 28 is greater than the maximum of this range and in response to the comparison the processor supplies a pulse on line 42 to shift up register 40 and count up counter 44.

This operation takes place repetitively until the comparison shows that the pen signal is in the range of amplitudes that occur when the pen is in the O and 1 transition. The counter 44 holds this address. For some operations, this is sufficient resolution of the X dimension address and the same operation is conducted with the Y dimension circuits 20 to form the Y address.

For a more specific address the increment of pen position, $x$, from the neighboring O state wire is detected. Processor 30 (or other signal source) supplies the signal Reference to give each of the X dimension wires the reference value and a pen reference signal appears at input 28 of the processor. The ratio of the pen signal to the reference equals the ratio of the value $x$ to the span between adjacent wires.

$x =$ (pen signal) (span) /reference signal

Processor 30 performs this operation to give the value of the $x$ component of the pen address. Processor 30 then controls the tablet to perform these operations to detect the Y dimension address components Y and $y$. The address may be useful directly in a graphic operation without regard to the physical distance that the address represents, or the address can be converted to the corresponding distance.

V. Other Embodiments

The cited patent of Mazza teaches an analog circuit for forming the ratio of the pen position signal to the pen reference signal and suitable analog circuits can perform this operation in the tablet of this invention. In many applications the drivers and/or the associated logic circuits can be physically located off the tablet structure and connected to the tablet wires by a suitably larger number of conductors. Similarly, a larger number of conductors can be provided to the tablet of FIG. 1 for parallel loading register 40 from processor 30.

Those skilled in the art will recognize other variations in the tablet of this invention within the spirit of the invention and the scope of the claims.

What is claimed is:
1. A tablet system comprising,
   a tablet having a plurality of closely spaced X dimension wires and a plurality of closely spaced Y dimension wires,
   means including an oscillator for providing an alternating sequence of binary voltage levels representing 1 and 0 logic values,
   driver means for applying said aternating voltage level sequence to said wires, said driver means being individual to said wires for giving an individual wire a selected state of activation with said alternating voltage level sequence,
   means for controlling said drivers to produce a selected pattern of activation of said wires in a selected dimension in which wires on one side of a selected tablet position are activated and wires on the other side of said selected position are not activated and a transition in the activation pattern occurs at said selected position,
   a pen positionable on the tablet to be capacitively coupled to said wires for receiving said alternating voltage level sequence signal, and
   means for receiving said signal from said pen and for forming a pen positiion address in the selected dimension.
2. The tablet system of claim 1 wherein said means for controlling sad drivers includes means for controlling said drivers to activate wires to one side of the pen position and not to activate wires on the other side of the pen position.
3. The tablet system of claim 2 wherein said means for controlling said drivers comprises,
   a register having a plurality of stages for holding binary values signifying the activation state of a corresponding wire, and
   logic means connecting the inputs of said drivers to said oscillator and to an associated stage of said register.
4. The tablet system of claim 3 wherein said means for controlling said drivers includes,
   means for setting each stage of said register to a first logic state,
   means for shifting said register in a selected direction and entering second logic state values into one end of said register,
   whereby wires on one side of a selected tablet position are activated and wires on the other side of said selected position are not activated.
5. The tablet system of claim 4 wherein said means for controlling said drivers includes means for shifting said register in the opposite direction and entering the first logic state values in the opposite end of the register, whereby the activation pattern of the wires can be shifted in either direction.
6. The tablet system of claim 5 wherein said means for forming the pen position address includes a counter connected to be reset by said means for setting each stage of said register to said first logic state and to be counted up and counted down in response to said means for shifting said register in said one direction and said opposite direction, whereby the count value in said counter identifies a wire where a transition occurs from an activated state to a not activated state.

7. The tablet system of claim 6 wherein said means for controlling said drivers includes means for controlling said drivers to activate each of said wires independently of the state of said register for the operation of producing a pen reference position.

* * * * *